(12) United States Patent  (10) Patent No.: US 9,327,745 B2
Tsai  (45) Date of Patent: May 3, 2016

(54) HANDCART

(71) Applicant: Haiming Tsai, Tainan (TW)

(72) Inventor: Haiming Tsai, Tainan (TW)

( * ) Notice: Subject to any disclaimer, the term of this patent is extended or adjusted under 35 U.S.C. 154(b) by 0 days.

(21) Appl. No.: 14/121,789

(22) Filed: Oct. 20, 2014

(65) Prior Publication Data

US 2015/0123363 A1 May 7, 2015

(30) Foreign Application Priority Data

Nov. 5, 2013 (TW) .............................. 102140057 A
Apr. 30, 2014 (TW) .............................. 103115474 A (51) Int. Cl.
*B62B 1/20* (2006.01)
*B62B 1/00* (2006.01)
*B62B 5/00* (2006.01)
*B62B 1/04* (2006.01)

(52) U.S. Cl.
CPC ...................................... *B62B 1/042* (2013.01)

(58) Field of Classification Search
CPC ............ B62B 5/06; B62B 5/067; B62B 1/00; B62B 1/047; B62B 1/125; B62B 2202/24; A45C 13/262; A45C 13/267
USPC ............ 280/655.1, 43.1, 47.315, 47.131, 655
See application file for complete search history.

(56) References Cited

U.S. PATENT DOCUMENTS

| 4,563,014 | A |   | 1/1986  | Mortenson |            |
|-----------|---|---|---------|-----------|------------|
| 4,917,392 | A | * | 4/1990  | Ambasz ............................ | 280/40 |
| D312,163  | S | * | 11/1990 | Ocuin ............................ | D34/26 |
| 4,989,889 | A | * | 2/1991  | Server Perez .................... | 280/40 |
| D335,738  | S | * | 5/1993  | Tsai ............................... | D34/26 |
| 5,267,745 | A | * | 12/1993 | Robertson et al. ......... | 280/250.1 |
| 5,414,895 | A | * | 5/1995  | Kazmark, Jr. ................ | 16/113.1 |
| 5,439,239 | A | * | 8/1995  | Su .................................... | 280/40 |
| 5,526,908 | A | * | 6/1996  | Wang ............................ | 190/115 |
| 5,769,194 | A | * | 6/1998  | Chang ......................... | 190/18 A |
| 5,863,055 | A | * | 1/1999  | Kasravi et al. ............ | 280/47.29 |
| 5,941,543 | A | * | 8/1999  | Kazmark, Jr. .............. | 280/47.29 |
| 6,047,798 | A | * | 4/2000  | Lin .............................. | 190/18 A |
| D453,602  | S | * | 2/2002  | Chang ............................ | D34/24 |
| 6,929,275 | B1| * | 8/2005  | Schlangen ................. | 280/250.1 |
| 7,784,816 | B2| * | 8/2010  | Jian et al. ...................... | 280/651 |
| D664,733  | S | * | 7/2012  | Yang ............................ | D34/24 |
| 8,474,098 | B1| * | 7/2013  | Yang ........................... | 16/113.1 |
| 2005/0285359 | A1 | * | 12/2005 | Wang ........................ | 280/47.29 |
| 2012/0273505 | A1 | * | 11/2012 | Bose ........................ | 220/592.16 |

FOREIGN PATENT DOCUMENTS

DE  690 07 670 T2  3/1994
DE  690 07 670 T2  7/1994
(Continued)

OTHER PUBLICATIONS

German Search Report dated Nov. 25, 2014, for DE 10 2014 015 245.6.

*Primary Examiner* — Joseph Rocca
*Assistant Examiner* — Travis Coolman (57) ABSTRACT

A handcart includes a handle, a cart frame and combination members. The handle and the cart frame are firmly combined together by the combination members, which are respectively composed of two combination seats, two fixing seats and an adjustment member. The combination seats and the fixing seats, which are made of metallic or non-metallic material, are firmly fixed in position by the combination members, and the adjustment member can be operated to have two retractable rods retracting inward and extending outward; therefore, the handle of the handcart of this invention is extensible and can be stably combined together with the cart frame, able to reinforce the structure of the handcart.

7 Claims, 9 Drawing Sheets

(56) References Cited

FOREIGN PATENT DOCUMENTS

| DE | 202 12 261 U1 | 11/2002 |
|---|---|---|
| DE | 102 10 448 A1 | 9/2003 |
| DE | 202 12 261 U1 | 9/2003 |
| DE | 20 2006 009 613 U1 | 11/2006 |
| DE | 20 2006 009 613 U1 | 12/2006 |

\* cited by examiner

HANDCART

BACKGROUND OF THE INVENTION

1. Field of the Invention

This invention relates to a handcart, particularly to one able to enhance combination stability of its retractable handle with its cart frame and attain practicability.

2. Description of the Prior Art

Generally, a handcart is a common appliance used for transporting goods by all trades. For instance, loading and unloading a cargo in transportation service, transporting building materials in building industry, and replenishing stock and returning goods already purchases have to depend on handcarts to enable a user to save strength and time of transport of goods. Therefore, correlated industries have tried to design and ameliorate handcarts.

A conventional vertical handcart, as disclosed in a Taiwan Publication No. 334965, includes a vertical back frame and a horizontal carrying frame combined together at right angle. The back frame has an upper end provided with a holding bar for a user to hold and apply force, and the holding bar has two ends respectively extending downward to form a framework rod, with a cross bar connected with the lower end of two framework rods and also connected with the carrying frame. The carrying frame is generally a flat plate, and the cross bar has its rear side or its lower end provided with at least one wheel so that a user can operate the holding bar and apply force to let the carrying frame inserted under a cargo, or a user can move a cargo onto the carrying frame manually and slant the handcart only to let the roller touch the ground and then push or pull the holding bar and move the handcart to a proper location for unloading the cargo, thus able to economize strength and time of transport of goods and convenient in use. However, the conventional handcart is disposed with an adjusting device on the holding bar, thus lessening a user's holding area and increasing inconvenience in use.

In addition, the conventional handcart is to have a large plastic sheet connected with both the cross bar and the framework rods so the plastic sheet is deficient in structural strength and still has to bear the cargo weight transmitted by the carrying frame and thus, when used for a long period of time, the combination of the plastic sheet is apt to become disjoined or cause fracture, letting the carrying frame together with the cargo drop down abruptly and injure a user's feet. Therefore, it is necessary to research and develop a handcart having great structural strength and able to reduce weight.

SUMMARY OF THE INVENTION

The objective of this invention is to offer a handcart with an extensible handle, and the handle and the cart frame of the handcart can be combined together comparatively stably.

The handcart in the present invention includes a handle, a cart frame and combination members. The handle is formed with a holding portion having two sides respectively stretching downward to form a rod body, which is provided with a fitting member and a positioning hole. The cart frame is set at the lower side of the handle and provided thereon with a bearing plate, casters and two cart frame rods respectively having an upper side disposed with a fitting member and a transverse hole. The combination members are assembled between the handle and the cart frame, consisting of combination seats, fixing seats and an adjustment member, and both the combination seats and the fixing seats are made of rigid material. Each combination seat is provided with two fitting holes and a combining member, while each fixing seat is disposed with a fitting hole, a fitting recessed surface and a combining sheet. The adjustment member is composed of a main body, two retractable rods, two actuating pieces and an elastic member. By so designing, the handcart of this invention is formed with an extensible handle and is stable in structure and safe in use.

BRIEF DESCRIPTION OF DRAWINGS

This invention will be better understood by referring to the accompanying drawings, wherein.

DETAILED DESCRIPTION OF THE PREFERRED EMBODIMENT

As shown in FIGS. 1 to 7, a first preferred embodiment of a handcart in the present invention includes a handle 1, a cart frame 2, a combination member 3 and plural threaded nail (N) as main components combined together.

The handle 1 has an upper side provided with a holding portion 10 having two ends respectively extending downward to form a rod body 11, which has an upper inner side and a lower inner side respectively bored with a positioning hole 110, 111 and has a lower end provided with a fitting member 112 and a threaded hole 113.

The cart frame 2 fixed at the lower side of the handle 1 is provided with a bearing plate 20, casters 21, cart frame rods 22 and a reinforcing bar 23. The bearing plate 20 and the casters 21 are designed to be moved together, while the cart frame rods 22 have their upper sides respectively disposed with a fitting member 220, a transverse insert hole 221 and a threaded hole 222.

The combination members 3 are set between the handle 1 and the cart frame 2, consisting of two combination seats 30, two fixing seats 31 and an adjustment member 32. Both the combination seats 30 and the fixing seats 31 are made of rigid material, such as metallic material or nonmetallic material, and each combination seat 30 is formed with two fitting holes 300, 301 and a combining member 302. The fitting holes 300, 301 and the combining member 302 are respectively bored with a transverse insert hole 3000, 3010 and 3020, and fitting hole 301 and the combining member 302 respectively have a wall bored with a threaded hole 3011 and 3021. Each fixing seat 31 is provided with a fitting hole 310, a fitting recessed surface 311 and a combining sheet 312, and the fitting recessed surface 311 and the combining sheet 312 are respectively and oppositely bored with two threaded holes 3110 and 3120, while the fitting hole 310 has a wall bored with a positioning hole 3100. The adjustment member 32 is composed of a main body 320, two retractable rods 321, two actuating pieces 322 and an elastic member 323. The main body 320 has two sides respectively provided with a combination hole 3200, and the actuating pieces 322 can be moved to actuate the retractable rods 321 to retract inward and extend outward.

In assembling, firstly, the fitting hole 301 of the combination seat 30 is fitted around the fitting member 220 at the upper side of the cart frame rod 22 of the cart frame 2, and a threaded nail (N) is inserted through the threaded hole 3011 and threadably secured in the threaded hole 222 of the cart frame rod 22 and then, the rod body 11 of the handle 1 is inserted through the fitting hole 300 of the combination seat 30. Next, the tractable rods 321 at two sides of the adjustment member 32 are respectively and orderly inserted through the transverse insert holes 3020, 3010, 221 and 3000 and then inserted into the positioning hole 110 of the rod body 11 of the handle 1. Afterward, the main body 320 of the combination member 3 has its two sides respectively fitted with the combining members 302 of the combination seat 30 to have the combination hole 3200 of the main body 320 and the threaded hole 3021 of the combining member 302 firmly screwed together by a threaded nail (N). Subsequently, the fitting member 112 of the rod body 11 at the lower end fitted with the fitting hole 310 of the fixing seat 31 and then, a threaded nail (N) is inserted through the threaded hole 3100 and threadably secured in the threaded hole 113 of the rod body 11. Lastly, the combining sheet 312 is covered on the outer surface of the cart frame rod 22 of the cart frame 2, letting both the combining sheet 312 and the fitting recessed surface 311 tightly covered around the cart frame rod 22, and then the combining sheet 312 and the fitting recessed surface 311 are threadably fixed together by threaded nails (N) screwed in the threaded holes 3110 and 3120, thus finishing assembly of the handcart.

Figure 1:
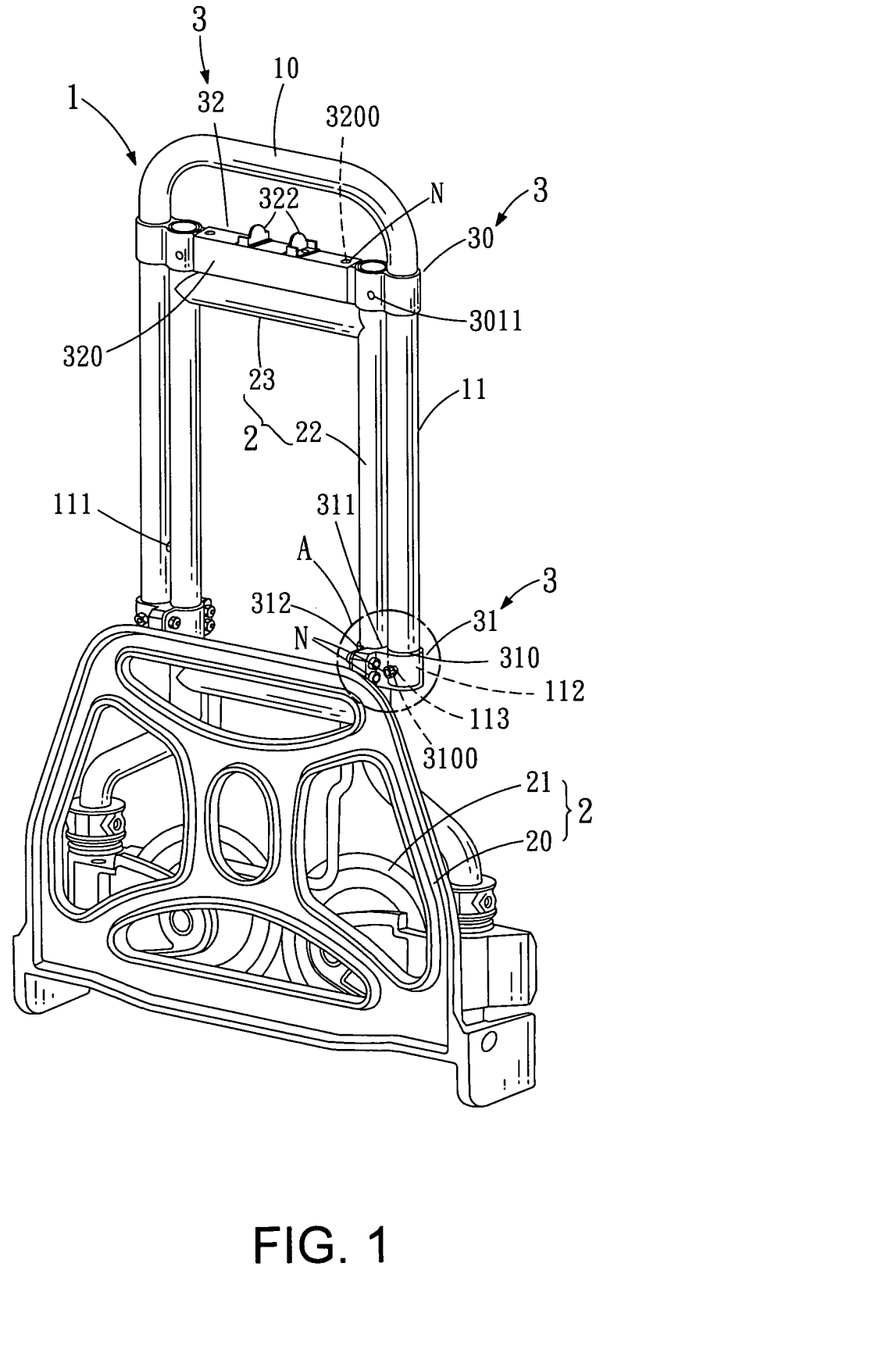
FIG. 1 is a perspective view of a first preferred embodiment of a handcart in the present invention.
Figure 2:
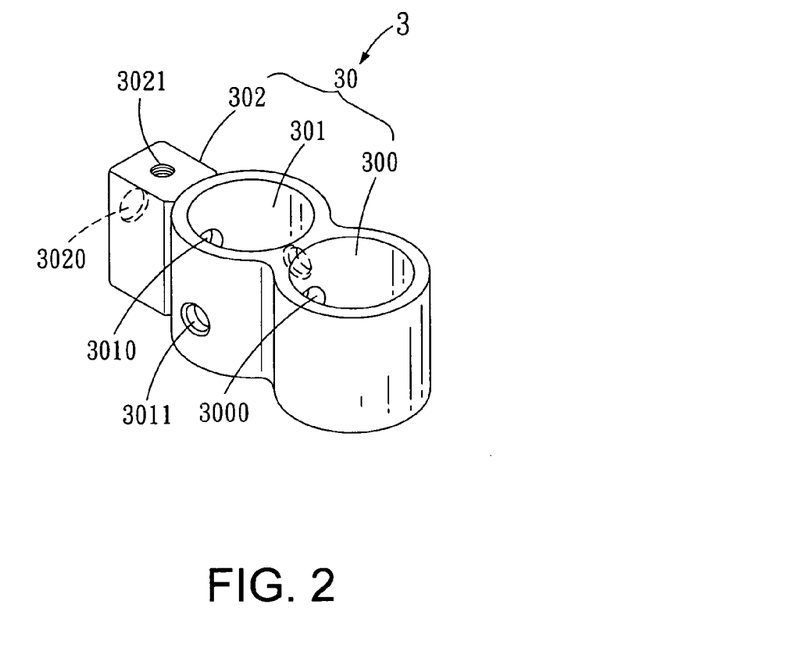
FIG. 2 is a perspective view of the first preferred embodiment of a combination seat of the handcart in the present invention.
Figure 3:
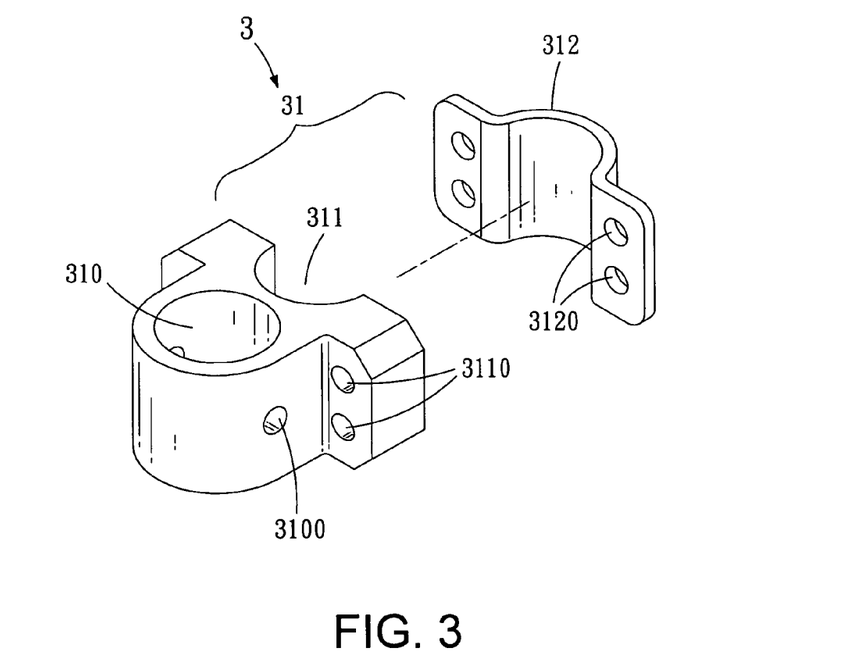
FIG. 3 is a perspective view of the first preferred embodiment of a fixing seat of the handcart in the present invention.
Figure 4:
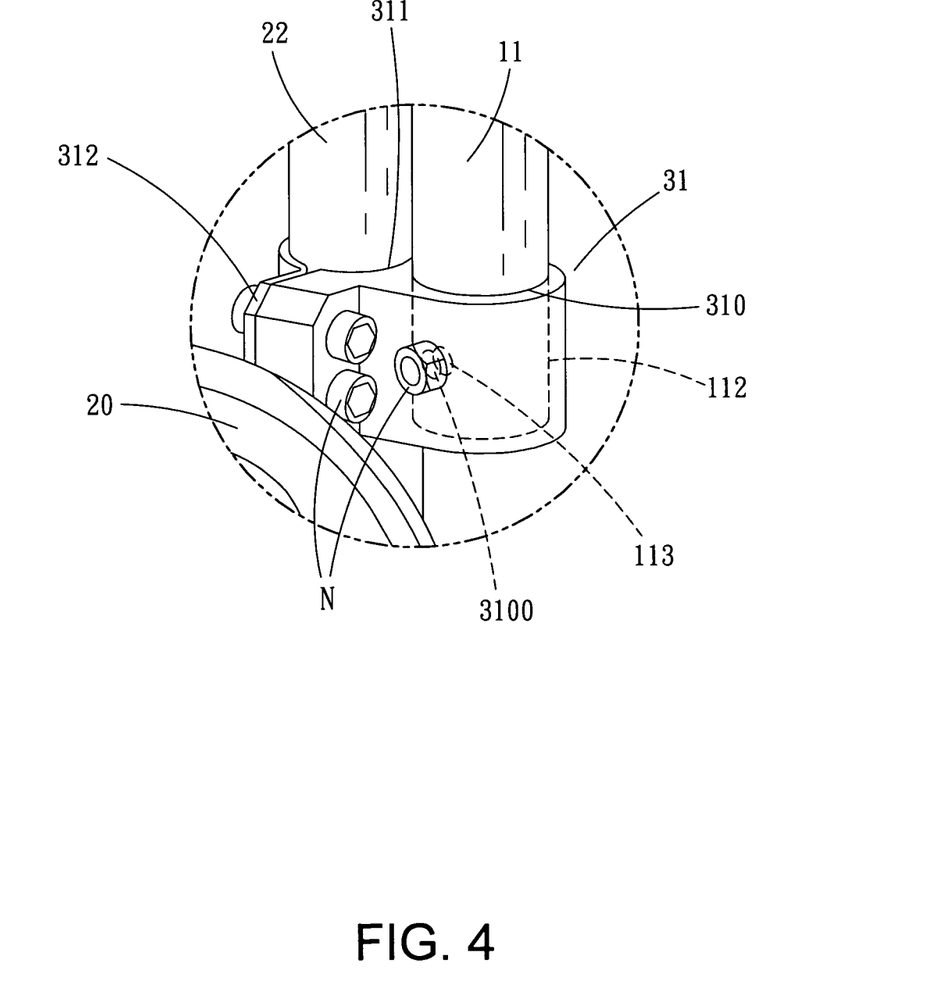
FIG. 4 is a magnified view of the portion A of FIG. 1.
Figure 5:
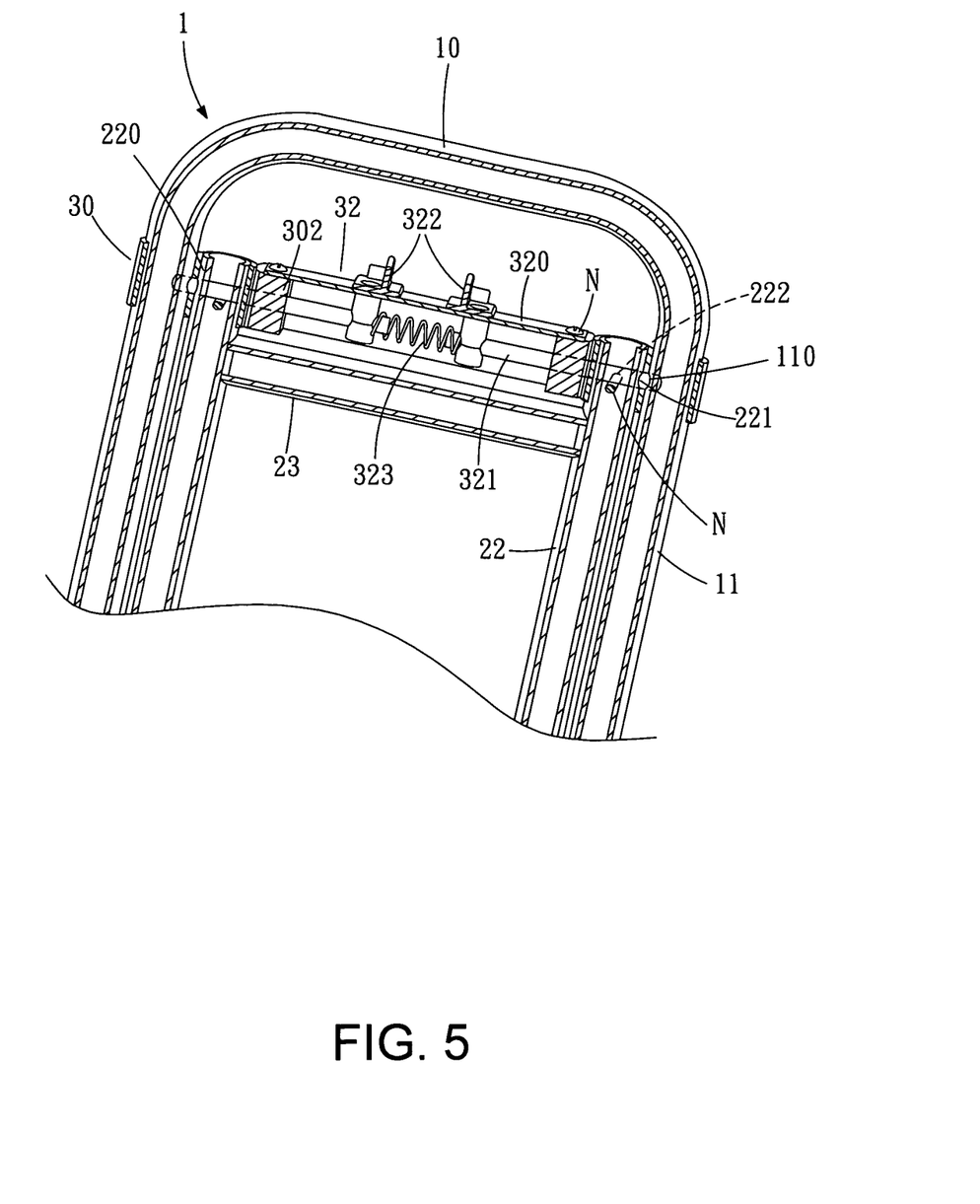
FIG. 5 is a partial cross-sectional view of the first preferred embodiment of the handcart in the present invention.
Figure 6:
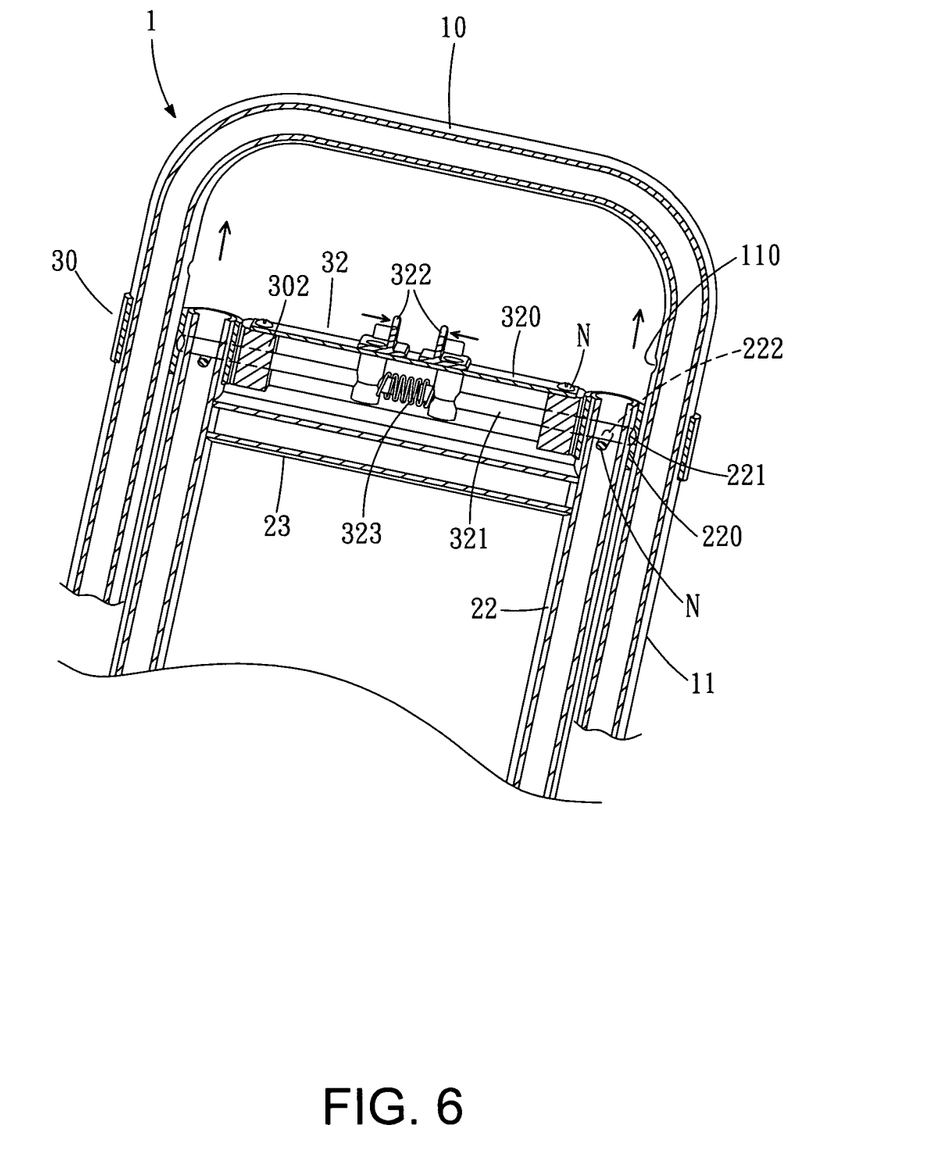
FIG. 6 is a schematic view of the handle of the handcart in the present invention, illustrating that the handle is drawn to stretch.
Figure 7:
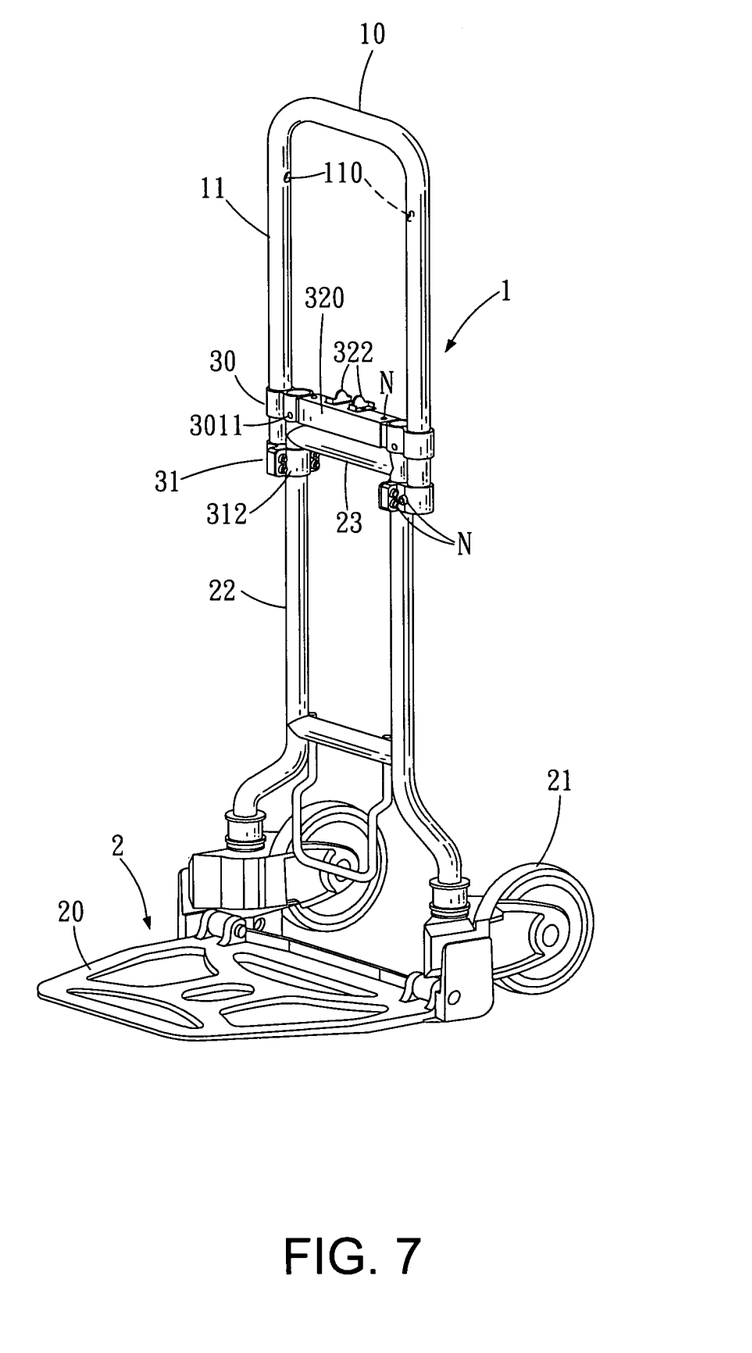
FIG. 7 is a perspective view of the handcart after the handle is drawn to stretch in the present invention.
Figure 8:
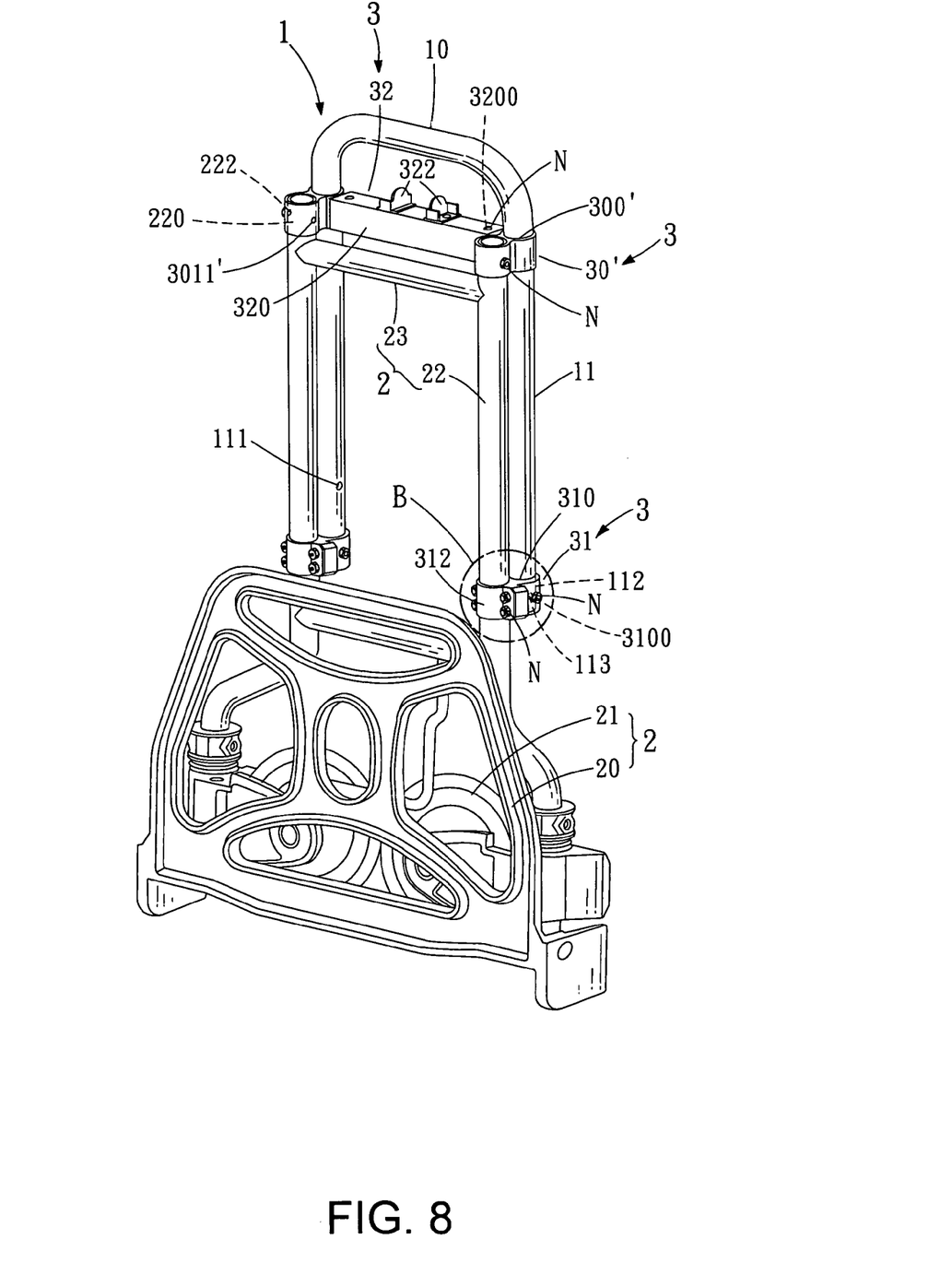
FIG. 8 is a perspective view of a second preferred embodiment of a handcart in the present invention.
Figure 9:
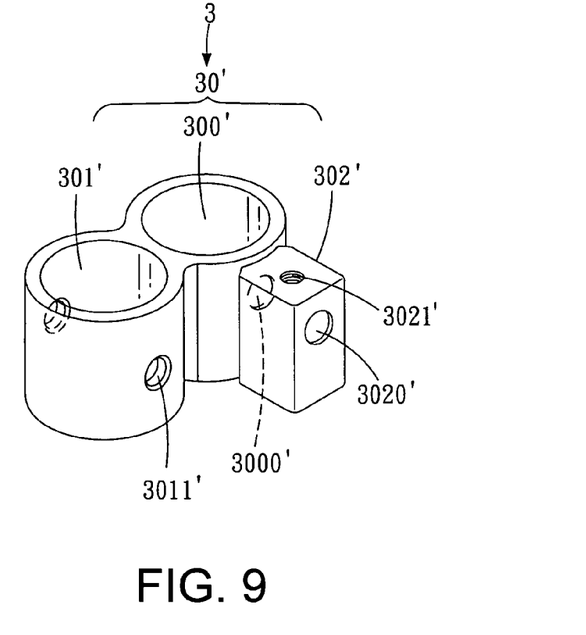
FIG. 9 is a perspective view of the second preferred embodiment of the combination seat of the handcart in the present invention.
Figure 10:
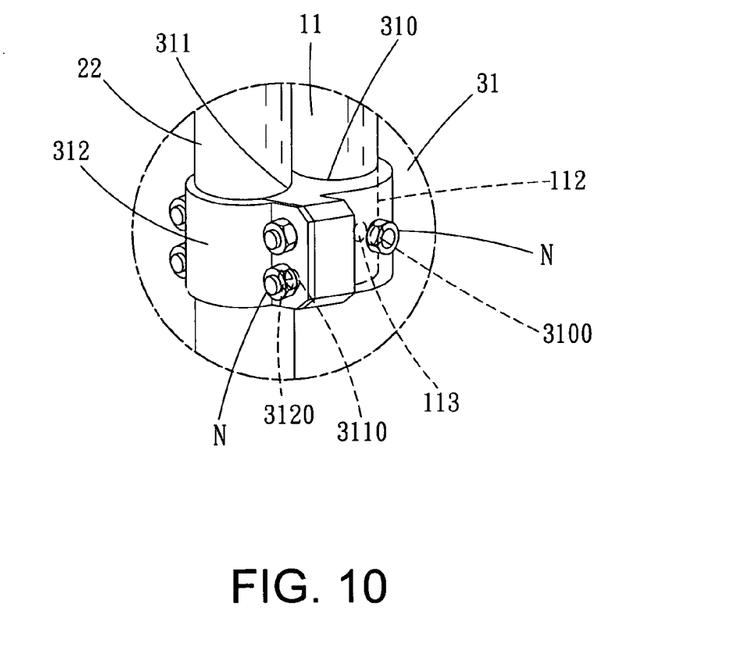
FIG. 10 is a magnified view of the portion B of the FIG. 8.
Figure 11:
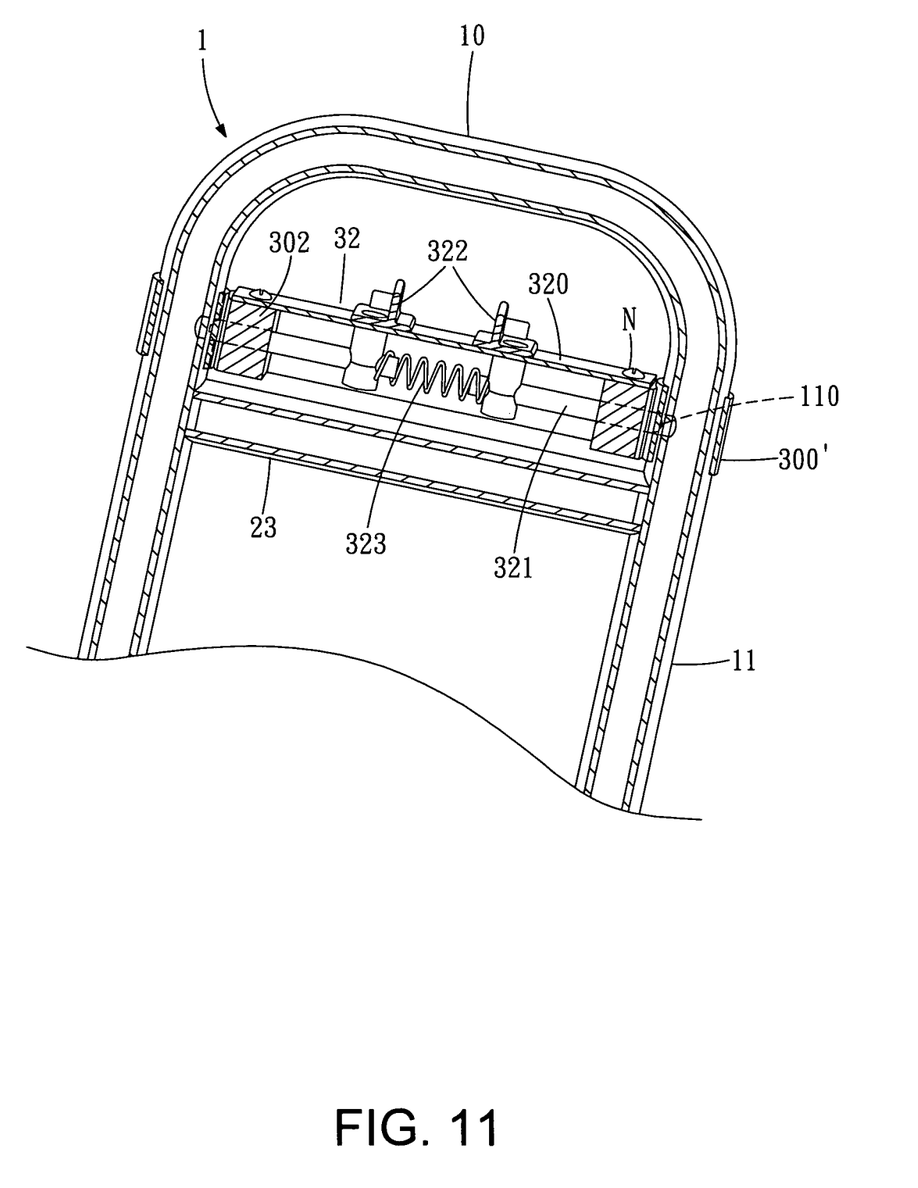
FIG. 11 is a partial cross-sectional view of the second preferred embodiment of the handcart in the present invention.

In using, only need to move inward the actuating pieces 322 of the adjustment member 32 to have the elastic member 323 compressed inward to actuate the end of the two retractable rods 321 to be disengaged from the positioning holes 110 of the rod body 11 and at this time, the handle 1 can be pulled upward to let the two retractable rods 321 engaged in the lower positioning holes 111 of the rod body 11, thus able to attain the object of moving the handle 1 upward and downward.

A second embodiment of a handcart in the present invention, as shown in FIGS. 3, 8 to 11, includes a handle 1, a cart frame 2, a combination member 3 and plural threaded nail (N) as main components combined together.

The handle 1 has an upper side provided with a holding portion 10 having two ends respectively extending downward to form a rod body 11, which has an upper inner side and a lower inner side respectively bored with a positioning hole 110, 111 and has a lower end provided with a fitting member 112 and a threaded hole 113.

The cart frame 2 fixed at the lower side of the handle 1 is provided with a bearing plate 20, casters 21, cart frame rods 22 and a reinforcing bar 23. The bearing plate 20 and the casters 21 are designed to be moved together, while the cart frame rods 22 have their upper sides respectively disposed with a fitting member 220 and a threaded hole 222.

The combination members 3 are set between the handle 1 and the cart frame 2, consisting of two combination seats 30', two fixing seats 31 and an adjustment member 32. Both the combination seats 30' and the fixing seats 31 are made of rigid material, such as metallic material or nonmetallic material, and each combination seat 30' is formed with two fitting holes 300', 301' and a combining member 302'. The fitting holes 301' and the combining member 302' are respectively bored with a transverse insert hole 3000', 3020', and fitting hole 301' and the combining member 302' respectively have a wall bored with a threaded hole 3011' and 3021'. The fitting hole 301' and the combining member 302' of the combination seat 30' are not arranged in alignment. Each fixing seat 31 is provided with a fitting hole 310, fitting recessed surface 311 and a combining sheet 312, and the fitting recessed surface 311 and the combining sheet 312 are respectively and oppositely bored with two threaded holes 3110 and 3120, while the fitting hole 310 has a wall bored with a positioning hole 3100. The adjustment member 32 is composed of a main body 320, two retractable rods 321, two actuating pieces 322 and an elastic member 323. The main body 320 has two sides respectively provided with combination hole 3200, and the actuating pieces 322 can be moved to actuate the retractable rods 321 to retract inward and extend outward.

In assembling, firstly, the fitting hole 301' of the combination seat 30' is fitted around the fitting member 220 at the upper side of the cart frame rod 22 of the cart frame 2, and a threaded nail (N) is inserted through the threaded hole 3011' and threadably secured in the threaded hole 222 of the cart frame rod 22 and then, the rod body 11 of the handle 1 is inserted through the fitting hole 300' of the combination seat 30'. Next, the tractable rods 321 at two sides of the adjustment member 32 are respectively and orderly inserted through the transverse insert holes 3020' and 3000' and then inserted into the positioning hole 110 of the rod body 11 and fitted with the combining member 302'; and then the combination hole 3200 of the main body 320 and the threaded hole 3021' of the combining member 302' firmly screwed together by a threaded nail (N). Subsequently, the fitting member 112 of the rod body 11 at the lower end fitted with the fitting hole 310 of the fixing seat 31 and then, a threaded nail (N) is inserted through the threaded hole 3100 and threadably secured in the threaded hole 113 of the rod body 11. Lastly, the combining sheet 312 is covered on the outer surface of the cart frame rod 22 of the cart frame 2, letting both the combining sheet 312 and the fitting recessed surface 311 tightly covered around the cart frame rod 22, and then the combining sheet 312 and the fitting recessed surface 311 are threadably fixed together by threaded nails (N) screwed in the threaded holes 3110 and 3120, thus finishing assembly of the handcart.

As can be seen from the above description, this invention has the following advantages:

1. The combination seat 30, 30' and the fixing seat 31 are of this invention are made of metallic or nonmetallic material with greater rigidity, able to elevate combination stability of the handcart.

2. Made of rigid metallic or nonmetallic material, the combination seat 30, 30' and the fixing seat 31 are stable in structure and will never be oxidized and broken; therefore, the handcart of this invention is completely safe in use.

3. The combination seat 30, 30' and the fixing seat 31 of the handcart of this invention are made of rigid metallic or nonmetallic material so they are impossible to be broken due to collision, able to prolong their service life.

4. The handcart of this invention can be designed to have the rod body 11 of the handle 1 and the cart frame rod 22 of the cart frame 2 arranged tandem and still can maintain the strength of the handcart.

5. The handcart of this invention is provided with no adjustment device on the handle, thus enabling a user to use the handcart more conveniently.

While the preferred embodiments of the invention have been described above, it will be recognized and understood that various modifications may be made therein and the appended claims are intended to cover all such modifications that may fall within the spirit and scope of the invention.

What is claimed is:

1. A handcart comprising:
    a handle formed with a holding portion, said holding portion having two sides respectively stretching downward to form a rod body, each said rod body provided with a fitting member and a positioning hole;
    a cart frame positioned under said handle, said cart frame provided with a bearing plate, casters and cart frame rods, said cart frame rods respectively disposed with a fitting member and a transverse insert hole;
    a combination member assembled between said handle and said cart frame, said combination member composed of combination seats, fixing seats and an adjustment member, both said combination seats and said fixing seats made of rigid material, each said combination seat provided with two fitting holes and a combining member, each said fixing seat provided with a fitting hole, a fitting recessed surface and combining sheet, said adjustment member composed of a main body, two retractable rods, two actuating pieces and an elastic member;
    wherein said handle is retractable; and
    wherein said combination seat is bored with transverse insert holes for said retractable rod to be inserted and positioned therein.

2. A handcart comprising:
    a handle formed with a holding portion, said holding portion having two sides respectively stretching downward to form a rod body, each said rod body provided with a fitting member and a positioning hole;
    a cart frame positioned under said handle, said cart frame provided with a bearing plate, casters and cart frame rods, said cart frame rods respectively disposed with a fitting member and a transverse insert hole;
    a combination member assembled between said handle and said cart frame, said combination member composed of combination seats, fixing seats and an adjustment member, both said combination seats and said fixing seats made of rigid material, each said combination seat provided with two fitting holes and a combining member, each said fixing seat provided with a fitting hole, a fitting recessed surface and combining sheet, said adjustment member composed of a main body, two retractable rods, two actuating pieces and an elastic member;
    wherein each said combining member is configured to secure the corresponding combination seat to the main body of the adjustment member; and
    wherein said handle is retractable.

3. The handcart as claimed in claim 2, wherein both said combination seats and said fixing seats are made of rigid material, which is metallic material.

4. The handcart as claimed in claim 2, wherein both said combination seats and said fixing seats are made of rigid material, which is non-metallic material.

5. A handcart comprising:
    a handle formed with a holding portion, said holding portion having two sides respectively stretching downward to form a rod body, each said rod body provided with a fitting member and a positioning hole;
    a cart frame positioned under said handle, said cart frame provided with a bearing plate, casters and cart frame rods, said cart frame rods respectively disposed with a fitting member;
    a combination member set between a handle and a cart frame, said combination member including combination seats, fixing seats and an adjustment member, both said combination seats and said fixing seats made of rigid material, each combination seat provided with two fitting holes and a combining member, said fitting holes and said combining member arranged not in alignment, each said fixing seat formed with a fitting hole, a fitting recessed surface and a combining sheet, said adjustment member composed of a main body, two retractable rods, two actuating pieces and an elastic member;
    wherein said handle is extensible; and
    wherein said combination seat is bored with transverse insert holes for said retractable rod to be inserted and positioned therein.

6. The handcart as claimed in claim 5, wherein both said combination seats and said fixing seats are made of rigid material, which is non-metallic material.

7. The handcart as claimed in claim 5, wherein both said combination seats and said fixing seats are made of rigid material, which is metallic material.

* * * * *